US012759946B2

(12) United States Patent
Torosyan et al.

(10) Patent No.: US 12,759,946 B2
(45) Date of Patent: Oct. 13, 2026

(54) LOW TEMPERATURE CARBON/BN/ALUMINUM OXIDE COATING

(71) Applicant: RICHTER PRECISION INC., East Petersburg, PA (US)

(72) Inventors: Aghasi Torosyan, Lancaster, PA (US); Hans E. Richter, Manheim, PA (US); Bikram S. Kamboj, East Petersburg, PA (US)

(73) Assignee: Richter Precision, Inc., East Petersburg, PA (US)

( * ) Notice: Subject to any disclaimer, the term of this patent is extended or adjusted under 35 U.S.C. 154(b) by 581 days.

(21) Appl. No.: 18/079,350

(22) Filed: Dec. 12, 2022

(65) Prior Publication Data

US 2023/0118131 A1 Apr. 20, 2023

Related U.S. Application Data

(63) Continuation of application No. 17/121,917, filed on Dec. 15, 2020, now Pat. No. 11,634,365.
(Continued)

(51) Int. Cl.
*C04B 35/583* (2006.01)
*C04B 35/622* (2006.01)
(Continued)

(52) U.S. Cl.
CPC ...... *C04B 35/583* (2013.01); *C04B 35/62222* (2013.01); *C04B 35/62635* (2013.01); *C04B 35/6264* (2013.01); *C23C 24/045* (2013.01); *C04B 2235/3217* (2013.01); *C04B 2235/386* (2013.01); *C04B 2235/425* (2013.01); *C04B 2235/5436* (2013.01); *C04B 2235/5445* (2013.01); *C04B 2235/606* (2013.01); *C04B 2235/95* (2013.01); *C04B 2235/9669* (2013.01); *C23C 24/00* (2013.01); *F41A 21/22* (2013.01)

(58) Field of Classification Search
CPC ........ C04B 2235/386; C04B 2235/425; C04B 2235/3217
See application file for complete search history.

(56) References Cited

U.S. PATENT DOCUMENTS

| | | | |
|---|---|---|---|
| 4,655,851 | A | 4/1987 | Loos |
| 5,594,231 | A | 1/1997 | Pellicori et al. |

(Continued)

FOREIGN PATENT DOCUMENTS

| | | | |
|---|---|---|---|
| CA | 1265729 | | 2/1990 |
| CN | 104559424 | A | 4/2015 |

(Continued)

*Primary Examiner* — Alex A Rolland
(74) *Attorney, Agent, or Firm* — Saxton & Stump, LLC

(57) ABSTRACT

A method of forming an activated coating composition is disclosed. The method includes providing (a) boron nitride, (b) carbon, (c) aluminum oxide and (d) a liquid carrier. Each of the boron nitride, carbon and aluminum oxide are in particulate form. The coating composition is activated to form an activated coating composition. The activated coating composition includes active components having from about 60.0 wt % to about 90.0 wt % boron nitride, from about 16 wt % to about 24 wt % carbon and from about 4 wt % to about 6 wt % aluminum oxide. A coating method, coated substrate and activated coating composition are also disclosed.

20 Claims, 10 Drawing Sheets

Related U.S. Application Data

(60) Provisional application No. 62/951,190, filed on Dec. 20, 2019.

(51) Int. Cl.

| | |
|---|---|
| ***C04B 35/626*** | (2006.01) |
| ***C23C 24/00*** | (2006.01) |
| ***C23C 24/04*** | (2006.01) |
| ***F41A 21/22*** | (2006.01) |

(56) References Cited

U.S. PATENT DOCUMENTS

| | | | | |
|---|---|---|---|---|
| 6,726,964 | B1 | 4/2004 | Thompson et al. | |
| 7,261,925 | B2 | 8/2007 | Nesbitt | |
| 7,655,100 | B2 | 2/2010 | Kuwabara | |
| 10,392,499 | B2 | 8/2019 | Yun et al. | |
| 2005/0266170 | A1 | 12/2005 | Nesbitt | |
| 2007/0042218 | A1 | 2/2007 | Lang et al. | |
| 2007/0272231 | A1 | 11/2007 | Ambrose | |
| 2008/0138631 | A1 | 6/2008 | Patel et al. | |
| 2012/0184471 | A1* | 7/2012 | Windrich ................ | C09D 5/00 508/591 |
| 2014/0287208 | A1 | 9/2014 | Feldstein et al. | |
| 2017/0349762 | A1* | 12/2017 | Sasaki ................. | C10M 107/44 |

FOREIGN PATENT DOCUMENTS

| | | | |
|---|---|---|---|
| CN | 109988484 | A | 7/2019 |
| CN | 110105828 | A | 8/2019 |
| CN | 110218470 | A | 9/2019 |
| CN | 110218476 | A | 9/2019 |
| DE | 102018201715 | A1 | 8/2019 |
| EP | 2662469 | A3 | 11/2013 |
| GB | 2252333 | | 8/1992 |
| WO | 2004072357 | A2 | 8/2004 |
| WO | 2005121402 | A1 | 12/2005 |
| WO | 2018153105 | A1 | 8/2018 |

* cited by examiner

Tribo measurement

Tribo parameters

| Acquisition | | Sample | | Static partner | | Environment | |
|---|---|---|---|---|---|---|---|
| Radius: | 7.36 [mm] | -Coating: | 18 7.17.14 | - Coating: | none | Temperature: | 20.00[°C] |
| Lin. speed: | 3.50 [cm/s] | -Substrate: | HSS | - Substrate: | Al2O3 | Atmosphere: | Air |
| Normal load: | 2.00 [N] | - Cleaning: | Acetone | - Cleaning: | Acetone | Humidity: | 45.00[%] |
| Stop condit.: | 5000.00[m] | - Supplier: | RPI | - Supplier: | McMaster Carr | | |
| Effective stop: | meters | | | - Dimension: | 6.00[mm] | | |
| Acquisition rate: | 1.0 [hz] | | | - Geometry: | Ball | | |

Curve

Start: 0.144 min: 0.135 max: 0.157 mean: 0.151 std dev.: 0.004

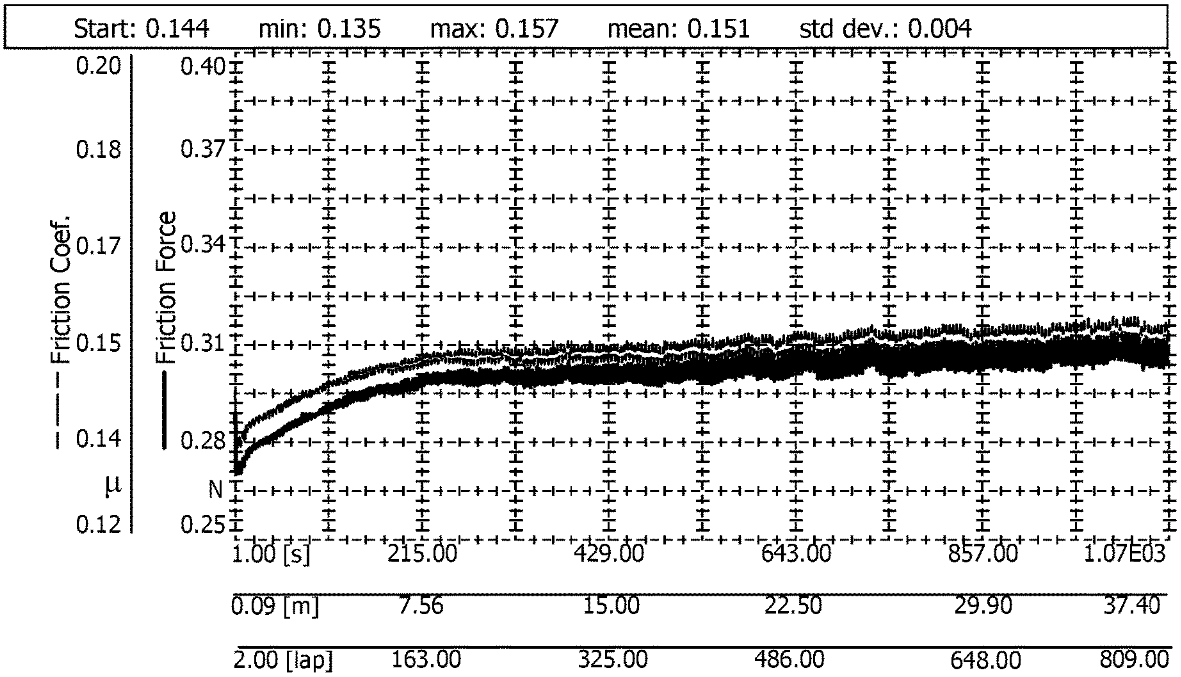

FIG. 4

Tribo measurement

Tribo parameters

| Acquisition | | Sample | | Static partner | | Environment | |
|---|---|---|---|---|---|---|---|
| Radius: | 4.83 [mm] | - Coating: | Test | - Substrate: | Al2O3 | Temperature: | 22.00[°C] |
| Lin. speed: | 3.89 [cm/s] | - Substrate: | Steel | - Dimension: | 6.00[mm] | Humidity: | 45.00[%] |
| Normal load: | 2.00 [N] | - Cleaning: | Acetone | - Geometry: | Ball | | |
| Stop condit.: | 1000.00[m] | - Supplier: | RPI | | | | |
| Effective stop: | meters | | | | | | |
| Acquisition rate: | 1.0 [hz] | | | | | | |

Curve

Start: 0.126 min: 0.126 max: 0.375 mean: 0.349 std dev.: 0.041

Tribo measurement

Tribo parameters

| Acquisition | | Sample | | Static partner | | Environment | |
|---|---|---|---|---|---|---|---|
| Radius: | 1.83 [mm] | - Coating: | C14 | - Coating: | None | Temperature: | 20.00[°C] |
| Lin. speed: | 2.00 [cm/s] | - Substrate: | K340 | - Substrate: | Al2O3 | Atmosphere: | Air |
| Normal load: | 5.00 [N] | - Cleaning: | Acetone | - Cleaning: | Acetone | Humidity: | 45.00[%] |
| Stop condit.: | 100.00[m] | - Supplier: | P&G | - Supplier: | McMaster Carr | | |
| Effective stop: | meters | | | - Dimension: | 6.35[mm] | | |
| Acquisition rate: | 1.0 [hz] | | | - Geometry: | Ball | | |

Curve

Start: 0.104 min: 0.104 max: 0.773 mean: 0.250 std dev.: 0.159

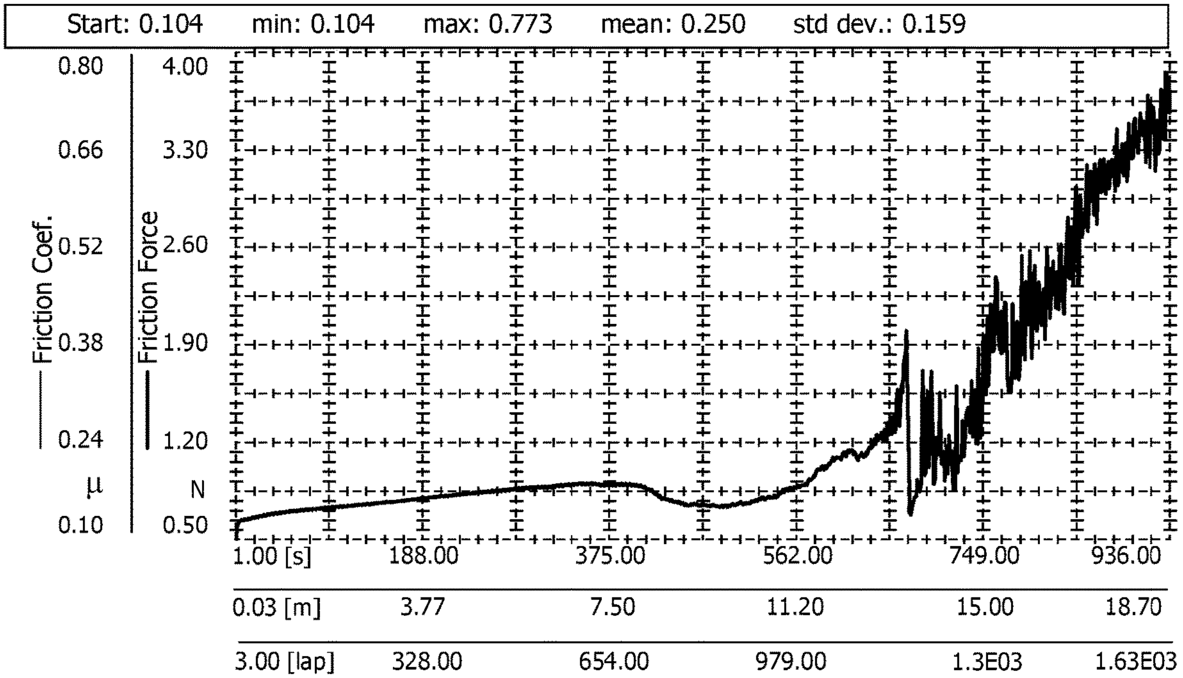

FIG. 8

Tribo measurement

Tribo parameters

| Acquisition | | Sample | | Static partner | | Environment | |
|---|---|---|---|---|---|---|---|
| Radius: | 1.83 [mm] | - Coating: | C14 | - Coating: | None | Temperature: | 20.00[°C] |
| Lin. speed: | 2.00 [cm/s] | - Substrate: | K340 | - Substrate: | Al2O3 | Atmosphere: | Air |
| Normal load: | 5.00 [N] | - Cleaning: | Acetone | - Cleaning: | Acetone | Humidity: | 45.00[%] |
| Stop condit.: | 100.00[m] | - Supplier: | P&G | - Supplier: | McMaster Carr | | |
| Effective stop: | meters | | | - Dimension: | 6.35[mm] | | |
| Acquisition rate: | 1.0 [hz] | | | - Geometry: | Ball | | |

Curve

Start: 0.093 min: 0.093 max: 0.785 mean: 0.488 std dev.: 0.278

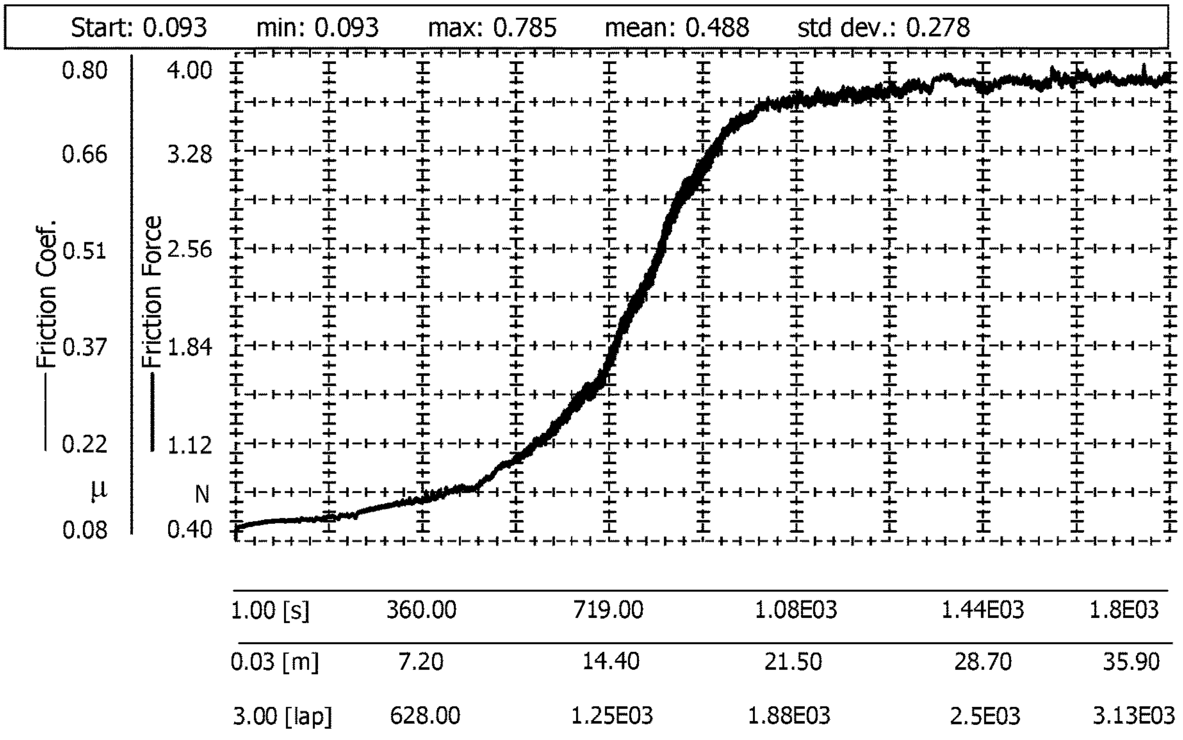

FIG. 10

LOW TEMPERATURE CARBON/BN/ALUMINUM OXIDE COATING

CROSS REFERENCE TO RELATED APPLICATIONS

This application claims priority and the benefit of U.S. patent application Ser. No. 17/121,917, filed Dec. 15, 2020, which claims priority and benefit of U.S. Provisional Patent Application No. 62/951,190, filed Dec. 20, 2019, titled Low Temperature Carbon/Aluminum Oxide Coating, all of which are incorporated by reference herein in their entirety.

FIELD OF THE INVENTION

The present invention is directed to a low temperature coating method and coating composition that provides a high temperature resistant, low friction, wear resistance, and anti-fouling coating.

BACKGROUND OF THE INVENTION

Chemical vapor deposition (CVD), physical vapor deposition (PVD) and thermal spray processes are known to form high temperature resistant coating. However, such processes require complicated equipment, expensive chemicals and/or high temperatures. In addition, these processes have limitations on size of the components to be coated and many are unable to coat components having complicated geometries. A coating that is inexpensive and easily applied at low temperatures would be desirable in the art.

Discharging weapons, such as guns or cannons, results in residue from the combustion of propellant and residue from wadding and the parts of a projectile that come into frictional contact with the interior surfaces of a weapon barrel. Cleaning a weapon barrel is periodically necessary to permit inspection, so that small cracks might be discovered before they can become dangerously enlarged. Cleaning is also necessary to avoid corrosion resulting from chemical products of combustion of a propellant, and to remove particulate matter left behind from friction of a projectile within the weapon barrel, particularly since some projectiles may leave behind particles of materials which might be hazardous to personnel. An antifouling, inert coating that doesn't permit buildup of carbon or other residue would be desirable in the art.

Metals and refractory materials are used in many applications, such as weapon barrels, that involve high temperatures, pressures and stress. The eventual failure of these materials is typically due to a combination of heat weakening of the metal, wearing and corrosion, depending on the application. Metals used in applications, such as, weapons components (e.g., the barrel or trigger), internal combustion engine components or industrial applications, such as piping, pumps or tanks are all subjected to varying stresses that eventually lead to decreased strength or failure.

For example, it is known that firearms, such as rifle or handgun barrels, become heated during extended use and such heating can lead to changes in the barrel that effect the accuracy or operation of the firearm. A firearm is a weapon that launches one, or many, projectile(s) at high velocity through confined burning of a propellant. The burning of the propellant fills the interior of an ammunition cartridge or the chamber of a firearm, leading to the expulsion of a bullet or shell. Heat produced by the burning propellant, as well as the heat produced by the projectile(s), are accelerated through the barrel, causing the temperature of the barrel to rise. As the temperature of the barrel rises, the barrel may change shape, changing the accuracy of the firearm and losing some of its strength. If the firearm is being used to fire multiple projectiles at a rapid rate, the barrel will continue to heat up until becoming softer and less accurate. If the heat is not properly dissipated by the barrel, the barrel will eventually undergo mechanical failure. The barrel, therefore, becomes the limiting factor for the rate at which projectiles can be fired from the firearm, and/or the velocity at which the projectiles are fired. A wear resistant coating that reduces or eliminates the weakening of the substrate, particularly in weapon barrels, would be desirable in the art.

Metals and refractory materials for use of components, such as firearm barrels, may include a chromium containing coating. Chromium-containing coatings reduce the friction between the components during operation. For example, in firearms, a chromium coating placed on the barrel bore will reduce the friction between the projectile and the barrel, producing less heat. A chromium coating may also provide increased resistance to corrosive materials. Chromium is a heavy metal which is deposited onto the metal surface using, for example, aqueous electrodeposition. The chromic acid used in the deposition process is a hazardous substance and is a major problem when it comes to environmental pollution prevention efforts and worker safety. Hexavalent chromium, used in electrodeposition processes, is a known carcinogen, which makes its disposal difficult and expensive. A low friction coating that doesn't suffer from the toxicity of existing coatings would be desirable in the art.

A coating method and coating composition that show one or more improvements in comparison to the prior art would be desirable in the art.

SUMMARY OF THE INVENTION

In an embodiment, the present disclosure includes a method of forming an activated coating composition. The method includes providing (a) boron nitride, (b) carbon, (c) aluminum oxide and (d) a liquid carrier. Each of the boron nitride, carbon and aluminum oxide are in particulate form. The coating composition is activated to form an activated coating composition. The activated coating composition includes active components having from about 60.0 wt % to about 90.0 wt % boron nitride, from about 16 wt % to about 24 wt % carbon and from about 4 wt % to about 6 wt % aluminum oxide.

In another embodiment, the present disclosure includes a method of coating a substrate. The method includes providing an activated coating composition (a) boron nitride, (b) carbon and (c) aluminum oxide in a (d) liquid carrier. A substrate surface is contacted with the activated coating composition. The activated coating composition includes active components having from about 60.0 wt % to about 90.0 wt % boron nitride, from about 16 wt % to about 24 wt % carbon and from about 4 wt % to about 6 wt % aluminum oxide.

In another embodiment, the present disclosure includes an activated coating composition comprising (a) boron nitride, (b) carbon, (c) aluminum oxide and (d) a liquid carrier. The activate composition has been activated with mechanical energy. The activated coating composition includes active components having from about 60.0 wt % to about 90.0 wt % boron nitride, from about 16 wt % to about 24 wt % carbon and from about 4 wt % to about 6 wt % aluminum oxide.

In another embodiment, the present disclosure includes a coating formed from a method of coating a substrate. The method includes providing an activated coating composition (a) boron nitride, (b) carbon and (c) aluminum oxide in a (d) liquid carrier. A substrate surface is contacted with the activated coating composition. The coating formed includes a coefficient of friction of 0.1 or less and a wear resistance having a distance to failure of greater than 500 meters. The activated coating composition includes active components having from about 60.0 wt % to about 90.0 wt % boron nitride, from about 16 wt % to about 24 wt % carbon and from about 4 wt % to about 6 wt % aluminum oxide.

Other features and advantages of the present invention will be apparent from the following more detailed description, taken in conjunction with the accompanying drawings which illustrate, by way of example, the principles of the invention.

BRIEF DESCRIPTION OF THE DRAWINGS

FIG. 4 is a graph depicting a pin-on-disk friction coefficient and wear measurement of a comparative coating formed with molybdenum.

FIG. 8 is a graph depicting a pin-on-disk friction coefficient and wear measurement of a comparative coating formed with 75% boron nitride/5% carbon/20% aluminum oxide.

FIG. 10 is a graph depicting a pin-on-disk friction coefficient and wear measurement of a comparative coating formed with 0% boron nitride/75% carbon/25% aluminum oxide.

DETAILED DESCRIPTION OF THE INVENTION

Figure 1:
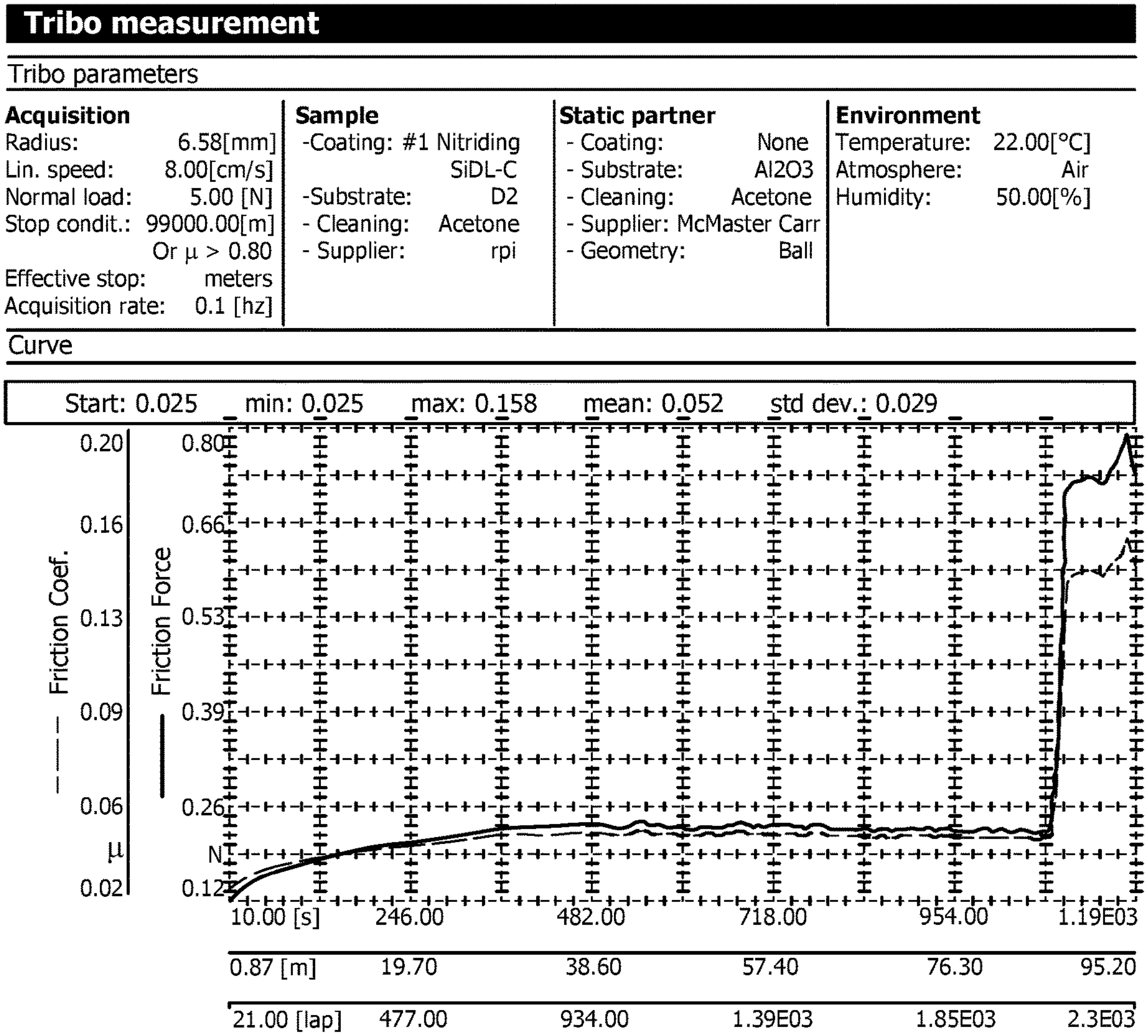
FIG. 1 is a graph depicting a pin-on-disk friction coefficient and wear measurement of a comparative coating formed with silicon.

Provided is a low temperature coating method and coating composition that provides a high temperature resistance, low friction, wear resistance, and anti-fouling coating that do not suffer from the drawbacks of the prior art. Embodiments of the present disclosure, for example, in comparison to concepts failing to include one or more of the features disclosed herein, include a coating process that forms the coating at low temperatures. In addition, the coating methods, according to the present invention, form low friction coatings. Further, the coating methods, according to the present invention, form thin film coatings. Further still, the coating methods, according to the present invention, require little or no post-coating processing. Further still, the coating methods, according to the present invention, form coatings having little or no visual surface finish. Further still, the coating methods, according to the present invention, may be applied on non-line-of-sight locations, including intricate and complex geometries.

The coating composition, according to embodiments of the present invention, includes activating a combination of the following three active components in a liquid carrier: (a) boron nitride, preferably hexagonal boron nitride (h-BN), (b) carbon, preferably graphite, and (c) aluminum oxide ($Al_2O_3$). The coating composition is activated by exposing the combined ingredients to mechanical energy. For example, the combined ingredients may be vibrated in the presence or absence of agitation enhancing structures, such as stainless-steel balls of varying sizes.

Boron Nitride

Boron nitride, as utilized in the active portion of the coating composition, may be any suitable boron nitride compound that is activatable in combination with carbon and aluminum oxide to form a low friction coating. The boron nitride is preferably a particulate hexagonal boron nitride (h-BN) having a particle size of from about 0.1 to about 50 micrometers. The boron nitride component for use in the composition, according to the present invention, includes a high purity powder. For example, in one embodiment, the purity of the boron nitride component is greater than 95% pure, by weight, or greater than 99% pure, by weight. One particularly suitable boron nitride compound is at least 99.999 wt % purity boron nitride having a density of about 2.29 g/cm$^3$ at 25° C. In one embodiment, the boron nitride component is devoid of forms of boron nitride other than hexagonal boron nitride (h-BN). For example, the boron nitride may be devoid of cubic boron nitride.

Carbon

The carbon component, as utilized in the active portion of the coating composition, may be any suitable carbon compound that is activatable in combination with boron nitride and aluminum oxide to form a low friction coating. The carbon is preferably a particulate graphite having a particle size of from about 0.1 to about 50 micrometers. The carbon component for use in the composition, according to the present invention, includes a high purity powder. For example, in one embodiment, the purity of the carbon component is greater than 99% pure, by weight. One particularly suitable carbon compound is at least 99.999 wt % or about 100 wt % carbon powder. In one embodiment, the carbon component is devoid of forms of carbon other than graphite. For example, the carbon component may be devoid of soot or diamond.

Aluminum Oxide

The aluminum oxide component, as utilized in the active portion of the coating composition, may be any suitable boron nitride compound that is activatable in combination with boron nitride and carbon to form a low friction coating. The aluminum oxide is preferably particulate aluminum oxide having a particle size of from about 0.1 to about 50 micrometers. The aluminum oxide component for use in the composition, according to the present invention, includes a high purity powder. For example, in one embodiment, the purity of the aluminum oxide component is greater than 99.5% pure, by weight. One particularly suitable aluminum oxide compound includes an optical finishing powder, such as a powder having a particle size of 5 microns or less. In one embodiment, the aluminum oxide component is devoid of forms of aluminum oxide other than corundum. For example, the aluminum oxide component may be devoid of forms of other than corundum.

Carrier

Suitable carriers for the coating composition include, but are not limited to, organic liquids, such as toluene or ammonia, or other suitable liquid. The carrier may be utilized in any suitable amount that forms a paste with the active component powders. Ammonia for use in the present invention may include 1 to 35 wt % aqueous ammonium hydroxide. In one embodiment, the carrier is utilized in an amount wherein for each 100 g of active component powder mix, 200 mL of carrier is utilized. Other suitable carriers include organic solvents, such as acetone or xylene, or water or other aqueous solvents.

The (a) boron nitride, (b) carbon and (c) aluminum oxide are provided in weight ratios (a):(b):(c) of from about 14 to about 18:from about 1 to about 8:from 0.3 to about 1.7; or from about 13 to about 17:from about 2 to about 7:from 0.5 to about 1.5; or from about 14 to about 16:from about 3 to about 6:from 0.8 to about 1.2; or about 15.0:5.0:1.0; or about 19.25:4.75:1.0. The active portion of the coating composition may include the active components (i.e., (a), (b), and (c)), exclusive of solvent and other non-active components, from about 60.0 wt % to about 90.0 wt % boron nitride, from about 16 wt % to about 24 wt % carbon and from about 4 wt % to about 6 wt % aluminum oxide, or from about 67.5 wt % to about 82.5 wt % boron nitride, from about 17 wt % to about 23 wt % carbon and from about 4.5 wt % to about 5.5 wt % aluminum oxide, or from about 70.0 wt % to about 80.0 wt % boron nitride, from about 18 wt % to about 22 wt % carbon and from about 4.5 wt % to about 5.5 wt % aluminum oxide. In one embodiment, the active portion of the coating composition includes about 75 wt % boron nitride, about 20 wt % of carbon and about 5 wt % of aluminum oxide or about 77 wt % boron nitride, about 19 wt % of carbon and about 4 wt % of aluminum oxide.

Substrate

The coating method and composition, according to the present disclosure, may provide coatings for metallic and non-metallic substrates. Suitable substrates include, articles formed of steel, aluminum, and other metals and alloys. Other suitable substrates may include articles formed of polymer, ceramics or articles coated with metallic or non-metallic compositions. Substrates may include any geometry, including, but not limited to, flat plates, tubular objects and/or complex geometries. Other suitable substrates may include cylindrical objects including large and small bore gun barrels, shafts, tubes, pipes and rods; molds and molding tools and equipment; industrial equipment, such as, but not limited to, tanks, pumps, and/or piping surfaces; automotive applications, such as, but not limited to, catalytic components, exhaust components, transmission components and/or cylinders/cylinder liners; friction surfaces, such as, but not limited to, gears and piston components. The coating composition may be applied to any surface of the substrate, such as the inside or the outside of tubes, barrels, shafts, sticks, or complex parts. Masking may be provided to provide selective formation of coating on desired surfaces.

The coating composition is preferably activated by exposure to mechanical energy, such as vibration. In one embodiment, the three active components are combined with a liquid carrier: (a) boron nitride, preferably hexagonal boron nitride (h-BN), (b) carbon, preferably graphite, and (c) aluminum oxide ($Al_2O_3$). The combined composition is vibrated in a container on a vibration table for sufficient time to form the activated coating composition. In one embodiment, components to be coated are loaded into a container. The container for coating the components may be a container formed of any suitable material, such as a polymeric material. The container is mounted on a vibration table and the filled container is vibrated for a time of at least 10 minutes or less than about 90 minutes or about 10 to 90 minutes or from about 20 to about 30 minutes. In some embodiments, the container is vibrated for times greater than 90 minutes, including for times after activation of the composition. In one embodiment, the vibration is provided at a frequency of less than 350 Hz or less than 300 Hz or less than 250 Hz or from about 5 Hz to about 300 Hz or from about 5 Hz to about 250 Hz. In one embodiment, agitation enhancing structures, such as stainless-steel balls, may be added to the container with the activated coating composition and the components to be coated. In one embodiment, the container is filled by about ⅔ of the volume by stainless steel balls of varied diameters from about 1 mm to about 15 mm or from about 3 mm to about 10 mm or from about 5 mm to about 7 mm. The activated coating is in the form of a paste. The activated coating composition is typically minimally activated after about 30 to 40 minutes. Activation is generally accomplished upon appearance of a uniform mass of paste or paint generally in grey color and the formed paste or paint has a contact angle between the liquid surface interface is near to zero which indicates high wetness to the metal surface. The activated coating composition is preferably applied to the substrate to be coated within a short period of time to preserve the activation of the active components. For example, the coating composition is applied to the substrate and/or the vessel to coat the substrate within 2 hours, within 1 hour, within 30 minutes, within 20 minutes, within 10 minutes or within 5 minutes of the completion of the activation.

The activated coating composition, according to the present invention, may be applied to a substrate by, for example, a) dynamic compound deposition (DCD) method or by a b) direct application. The coatings may be applied at low temperatures, including temperatures less than 100° F., such as at room temperature (about 25° F.). In addition, the coating may be applied on non-line-of-sight locations, including intricate and complex geometries, by utilization of immersion of the component in the activated coating composition.

In the dynamic compound deposition, any suitable container, such as a polymeric container, may be utilized to receive the activated coating composition and the component to be coated. In one embodiment, agitation enhancing structures, such as stainless-steel balls, may be added to the container with the activated coating composition and the components to be coated. In one embodiment, the container is filled by about ⅔ of the volume by stainless steel balls of varied diameters from about 1 mm to about 15 mm or from about 3 mm to about 10 mm or from about 5 mm to about 7 mm.

If the agitation enhancing structures are utilized, the component to be coated may be added to the container after the agitation enhancing structures. If necessary, due to component geometry, such as components having parts with sharp edges or precise geometry, the container may be segmented, such as by dividers, in order to prevent components from contacting each other and damaging the edges. After the component is loaded in the container, the activated coating composition is added to the container. The container may be sealed utilizing a cap or other sealing structure.

In order to facilitate the coating of the component, the container is exposed to mechanical energy. In one embodiment, the container is mounted on a vibration table and the filled container is vibrated for a time of less than about 60 minutes or about 10 to 40 minutes or from about 20 to about 30 minutes. In one embodiment, the vibration is provided at a frequency of less than 350 Hz or less than 300 Hz or less than 250 Hz or from about 10 Hz to about 300 Hz or from about 5 Hz to about 250 Hz. In certain embodiments, the activation of the coating composition and coating step are accomplished simultaneously in a single step. After the application of the mechanical energy, the component is removed from the container and the coating is dried. The coating may be dried by permitting the surface to passively dry or by active drying using a fan and/or heat. For example, the coating composition may be dried in a low temperature furnace at temperatures from about 80° F. to about 250° F. The excess coating material is removed from the surface by wiping, rinsing or blowing the excess material from the surface of the coated article. The coated article includes the coating, according to the present invention.

In the embodiment utilizing a direct application, the activated coating composition may be applied to the substrate utilizing any suitable application technique. For example, the activated coating composition may be applied to the surface by brushing, rolling, spraying or dipping the substrate. In one embodiment, a polymeric brush is utilized to apply the activated coating composition to the surface of the article to be coated. After application of the coating material, the applied coating is dried. The coating may be dried by permitting the surface to dry or by active drying using a fan and/or heat. For example, the coating composition may be dried in a low temperature furnace at temperatures from about 80° F. to about 250° F. The excess coating material is removed from the surface by wiping, rinsing or blowing the excess material from the surface of the coated article. The coated article includes the coating, according to the present invention.

In one embodiment, the coating is formed such that the coating requires little or no post-coating processing to provide the desired properties.

The coating formed from the coating composition, according to embodiments of the present invention, is a thin film that includes a coating thickness of less than about 2.0 microns or less than about 1.0 micron or from about 0.5 to about 1.0 microns or about 0.75 microns. The coating, according to the present invention, includes a low coefficient of friction, including a coefficient of friction of 0.1 or less or 0.05 or less. The coating, according to the present invention, includes a hardness of at least 750 HV or at least 1000 HV or at least 1250 HV or at least 1500 HV. The coating, according to the present invention, is colorless or near colorless and includes little or no visual surface finish. In certain embodiments, depending on the thickness, the coating may be colorless particularly when the thickness is less than 0.25 micron or it looks like light grey when the thickness is about 1-2 micron. In addition, the coating, according to the present invention, has high wear resistance, including wear resistance measured as a survival distance on a pin-on-disk tribological measurement device of greater than 500 meters (m) or greater than 750 m or greater than 1000 m. The presence of coating or non-exposure of substrate even after the testing with visual inspection determines that the coating survived. The wear distance is the distance where the coating is completely worn out visually and the performance starts to deteriorate.

Examples

Carrier Variation 26 g of a coating composition, according an embodiment of the invention, was formed by mixing 20 g of hexagonal boron nitride (h-BN) powder with 5 g of graphite powder and 1 g of corundum ($Al_2O_3$). Each of the h-BN powder, graphite and $Al_2O_3$ are available from Alfa Aesar, Haverhill, MA. The powder mixture of the h-BN powder, graphite powder and $Al_2O_3$ was added to 50 mL of liquid media in a 200 mL polymeric container ⅔ full of stainless-steel balls ranging from 6 mm to 10 mm. The mixture of those three components was activated in the liquid media by using a vibrating table. The polymer container containing the components in the liquid media was banded to a vibrating table with banding belts. The vibrating table includes an amplitude of 40 mm and a frequency of 300 Hz. The vibrating table is activated and permitted to vibrate the composition for 30 min. After the 20 to 25 minutes of shaking, the composition has a paste-like consistency.

The type of liquid media, amount of stainless-steel balls and time of activation are described below:

TABLE 1

| | Type of Liquid Media (50 mL) | Boron Nitride (g) | Graphite (g) | $Al_2O_3$ (g) |
|---|---|---|---|---|
| Example 1 | Toluene | 20 | 5 | 1 |
| Example 2 | Aqueous Ammonia | 20 | 5 | 1 |

Examples of a) dynamic compound deposition (DCD) method or by a b) direct application are provided.

In a dynamic compound deposition type of coating method, a polymer container was filled by ⅔ of the volume by stainless steel balls of varied diameters from 3 mm to 10 mm. A workpiece to be coated was loaded into the polymer container as much as container's volume allows along with 100-200 mL of the coating composition of Example 1. The container was then sealed with a cover. The container was positioned and mounted and fastened onto a vibrating table. The filled container was vibrated at a frequency of 50 Hz for about 30 mins. After the vibration was complete, component is removed and dried utilizing air cooling with a fan. Coating material was wiped with a cloth to remove residue remaining on the parts that are not well adhered to the surface.

In the direct application type of coating method, a polymer brush was utilized to brush the activated composition of Example 2 to the surface of a component. The coating was dried utilizing air cooling with a fan. Coating material was wiped with a cloth to remove residue remaining on the parts that are not well adhered to the surface.

Active Ingredient Variation

Pin-on-disk wear and friction testing was performed on a pin-on-disk tribological measurement device in a controlled atmosphere for various samples in the examples. The test coupons of the material to be tested are prepared and treated with different compositions and then set up on tribotester with an $Al_2O_3$ ball and is spun/moved in the circular motion to generate a track on the test coupon, the system software is able to calculate coefficient of friction/younger nodules from the speed, bearing weight on the test sample. The coefficient of friction and wear behavior of the different coatings utilize pin-on-disk-tests having a rotating disk under a stationary and uncoated spherical pin ($Al_2O_3$ ball with diameter of 6 mm) on which a normal load of from 1 to 5 N was applied. Wear resistance is calculated as the distance that the sphere travels along the sample prior to the destruction of the coating, the surface showing signs of being worn out or the properties of the uncoated sample change.

Coated samples were prepared having a constant weight composition, but variation of the metal component of the coating composition. Comparative Example 1 includes a coating composition having 75 wt % of silicon powder, 20 wt % of powdered graphite and 5 wt % of $Al_2O_3$ (corundum) in toluene to form a paste. The coating composition was applied to a standardized 304SS test coupon. The powder mixture of active components was added to 50 mL of liquid media in a 200 mL polymeric container ⅔ full of stainless-steel balls ranging from 6 mm to 10 mm. The mixture of those three components was activated in the liquid media by using a vibrating table. The polymer container containing the components in the liquid media is banded to a vibrating table with banding belts. The vibrating table includes an amplitude of 40 mm and a frequency of 300 Hz. The vibrating table was activated and permitted to vibrate the composition for 30 min. After the 20 to 25 minutes of shaking, the composition has a paste-like consistency. To coat the substrate, a polymer container was filled by ⅔ of the volume by stainless steel balls of varied diameters from 3 mm to 10 mm. A workpiece to be coated was loaded into the polymer container as much as container's volume allows along with 100-200 mL of the coating composition of Comparative Example 1. The container was then sealed with a cover. The container was positioned and mounted and fastened onto a vibrating table. The filled container was vibrated at an amplitude of 40 mm and a frequency of 300 Hz for about 30 mins. After the vibration was complete, component is removed and dried utilizing air cooling with a fan. Coating material was wiped with a cloth to remove residue remaining on the parts that are not well adhered to the surface.

The coefficient of friction and the wear resistance was measured on the pin-on-disk tribological measurement device described above. FIG. 1 shows the graph of the results from the testing of Comparative Example 1.

Figure 2:
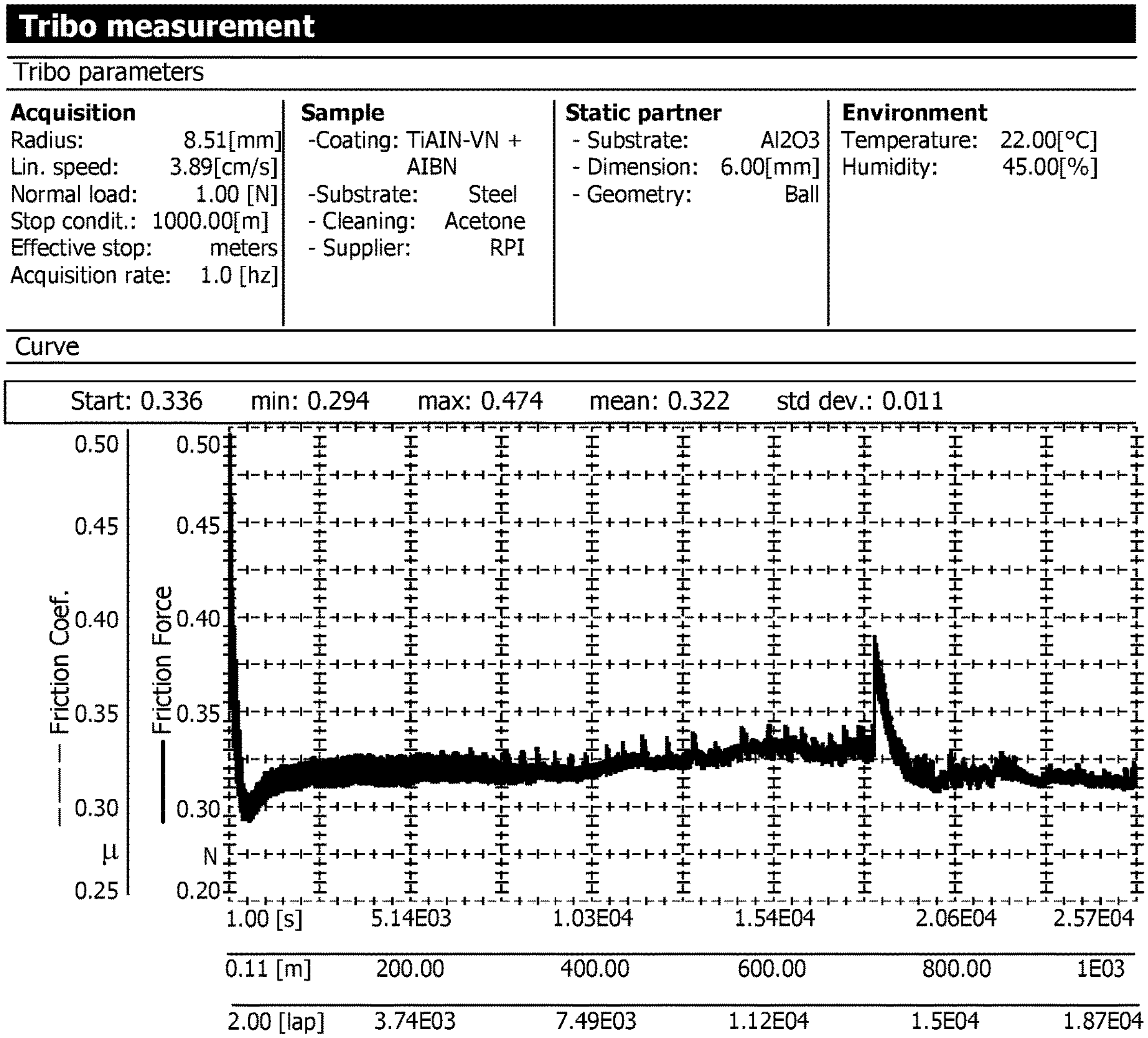
FIG. 2 is a graph depicting a pin-on-disk friction coefficient and wear measurement of a comparative example of an untreated substrate.

Comparative Example 2 included an uncoated standardized 304SS test coupon. The coefficient of friction and the wear resistance was measured on the pin-on-disk tribological measurement device described above. FIG. 2 shows the graph of the results from the testing of Comparative Example 2.

Figure 3:
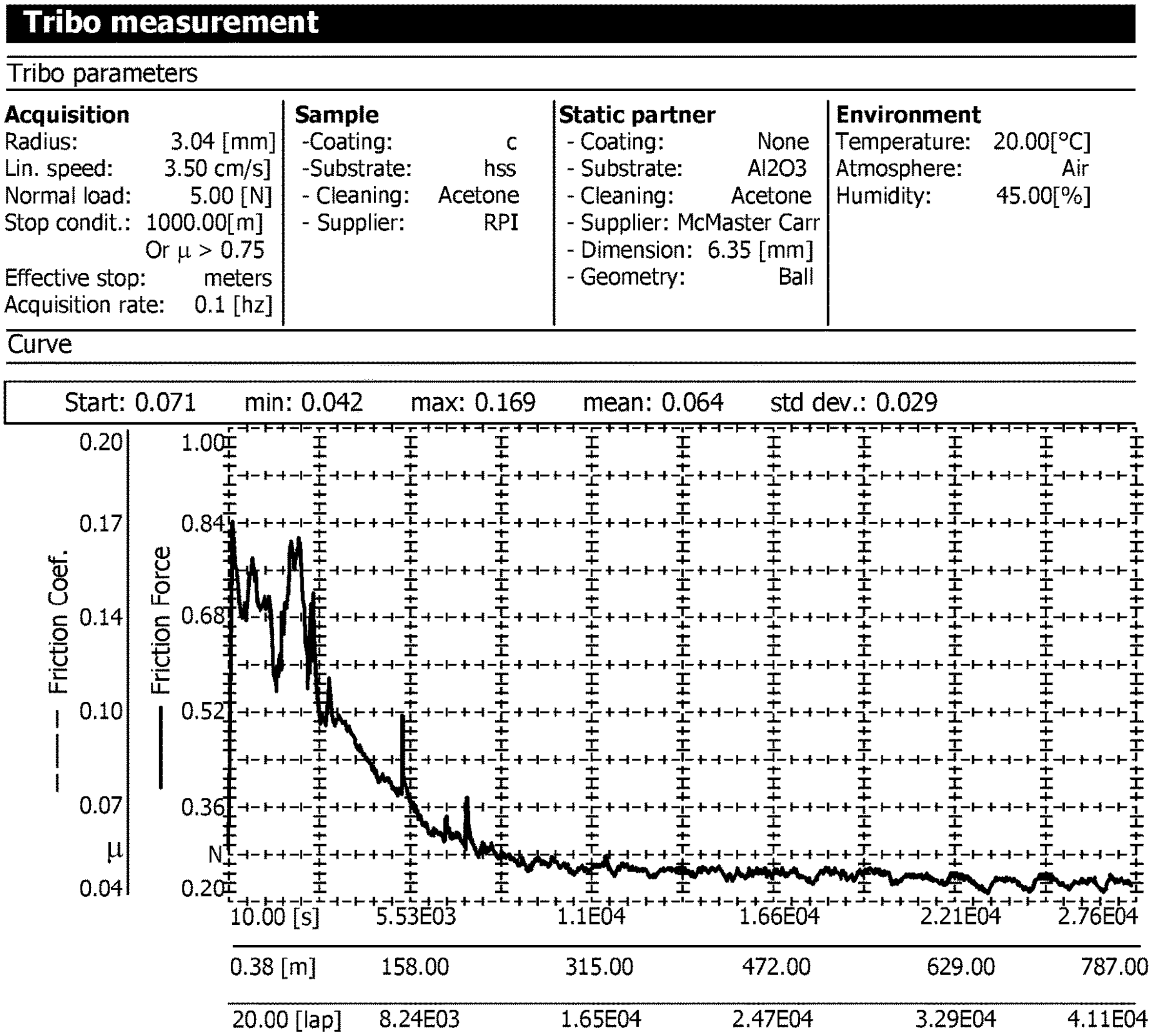
FIG. 3 is a graph depicting a pin-on-disk friction coefficient and wear measurement of an inventive coating formed with boron nitride, according to an embodiment of the current invention.

Example 3 included a coating composition having 75 wt % of hexagonal boron nitride (h-BN) powder, 20 wt % of graphite powder and 5 wt % of $Al_2O_3$ (corundum) in toluene to form a paste according to an embodiment of the present invention. The coating composition was applied to a standardized 304SS test coupon. The coating composition was activated, and the substrate was coated according to the process described with respect to Comparative Example 1. The coefficient of friction and the wear resistance was measured on the pin-on-disk tribological measurement device described above. FIG. 3 shows the graph of the results from the testing of Example 3.

Comparative Example 3 included a coating composition having 75 wt % of molybdenum disulfide ($MoS_2$) powder, 20 wt % of graphite powder and 5 wt % of $Al_2O_3$ (corundum) in toluene to form a paste. The coating composition was applied to a standardized 304SS test coupon. The coating composition was activated, and the substrate was coated according to the process described with respect to Comparative Example 1. The coefficient of friction and the wear resistance was measured on the pin-on-disk tribological measurement device described above. FIG. 4 shows the graph of the results from the testing of Comparative Example 4.

For each of the Examples above, all of the active powder components were obtained from Alfa Aesar, Haverhill, MA and had a purity of at least 99.99% and a particle size less than 5 microns.

TABLE 2 shows a summary of the coefficient of friction and wear resistance results of Comparative Examples 1-3 and Example 3.

TABLE 2

| Test Sample | Component Variable | Coefficient of Friction | Wear Resistance (distance in meters) |
|---|---|---|---|
| Comparative Example 1 | silicon powder | 0.052 | 89 meters |
| Comparative Example 2 | uncoated | 0.322 | 600-1000 meters |
| Example 3 | boron nitride | 0.064 | greater than 787 meters (no failure) |
| Comparative Example 3 | molybdenum disulfide | 0.151 | 7-37 meters |

For the collected test data, as shown in TABLE 2, it can be concluded that the composition represented by Example 3 with boron nitride provides the most desirable combination of properties. For all other combinations it can be seen that either the friction was very high or due to increased roughness from $Al_2O_3$ the total wear resistance distance was highly compromised.

Figure 5:
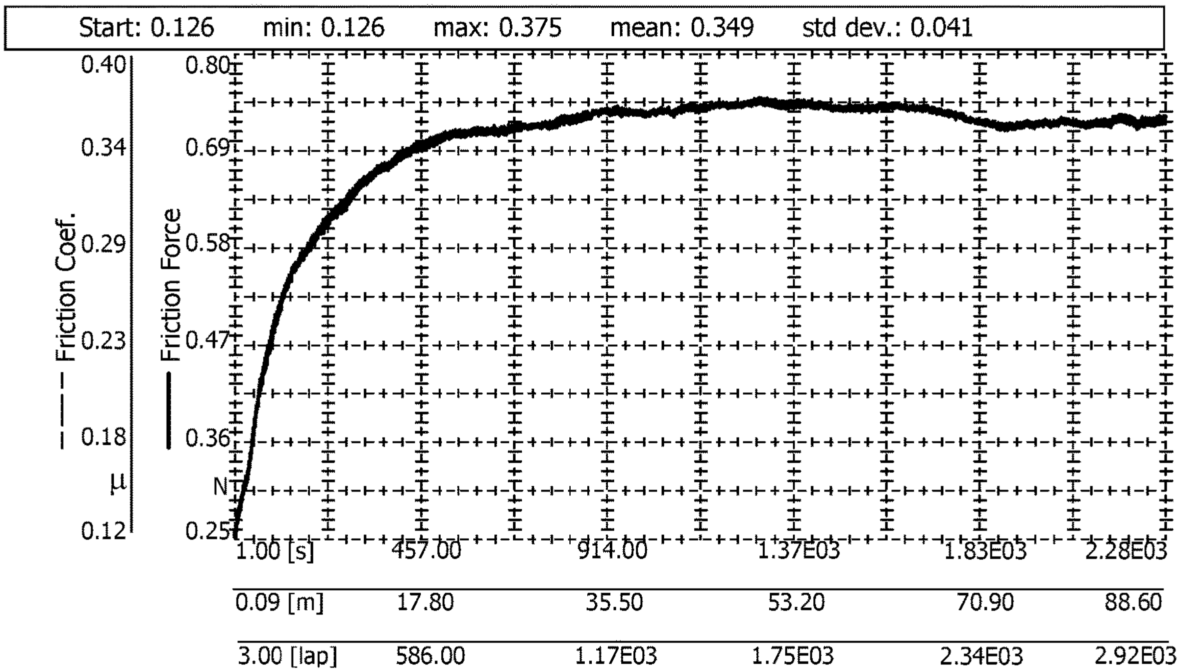
FIG. 5 is a graph depicting a pin-on-disk friction coefficient and wear measurement of a comparative coating formed with 50% boron nitride/20% carbon/30% aluminum oxide.

A coating according to Comparative Example 4 was formed using a coating composition having 50 wt % of hexagonal boron nitride (h-BN) powder, 20 wt % of graphite powder and 30 wt % of $Al_2O_3$ (corundum). The coating composition was applied to a standardized 304SS test coupon. The coating composition was activated, and the substrate was coated according to the process described with respect to Comparative Example 1. The coefficient of friction and the wear resistance was measured on the pin-on-disk tribological measurement device described above. FIG. 5 shows the graph of the results from the testing of Comparative Example 4.

Figure 6:
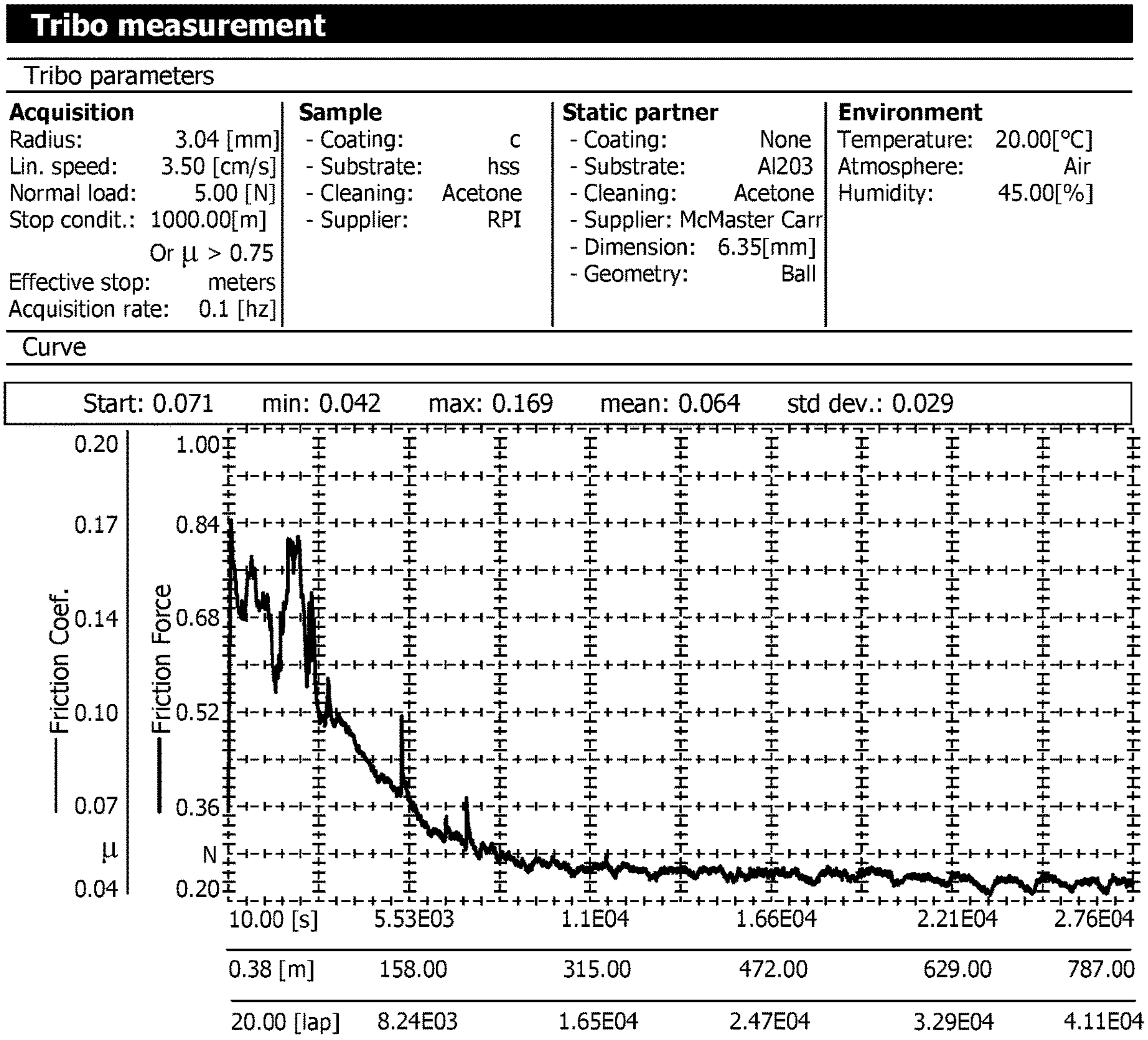
FIG. 6 is a graph depicting a pin-on-disk friction coefficient and wear measurement of an inventive coating formed with 75% boron nitride/20% carbon/5% aluminum oxide.

A coating according to Example 4 was formed using a coating composition having 75 wt % of hexagonal boron nitride (h-BN) powder, 20 wt % of graphite powder and 5 wt % of $Al_2O_3$ (corundum). The coating composition was applied to a standardized 304SS test coupon. The coating composition was activated, and the substrate was coated according to the process described with respect to Comparative Example 1. The coefficient of friction and the wear resistance was measured on the pin-on-disk tribological measurement device described above. FIG. 6 shows the graph of the results from the testing of Example 4.

Figure 7:
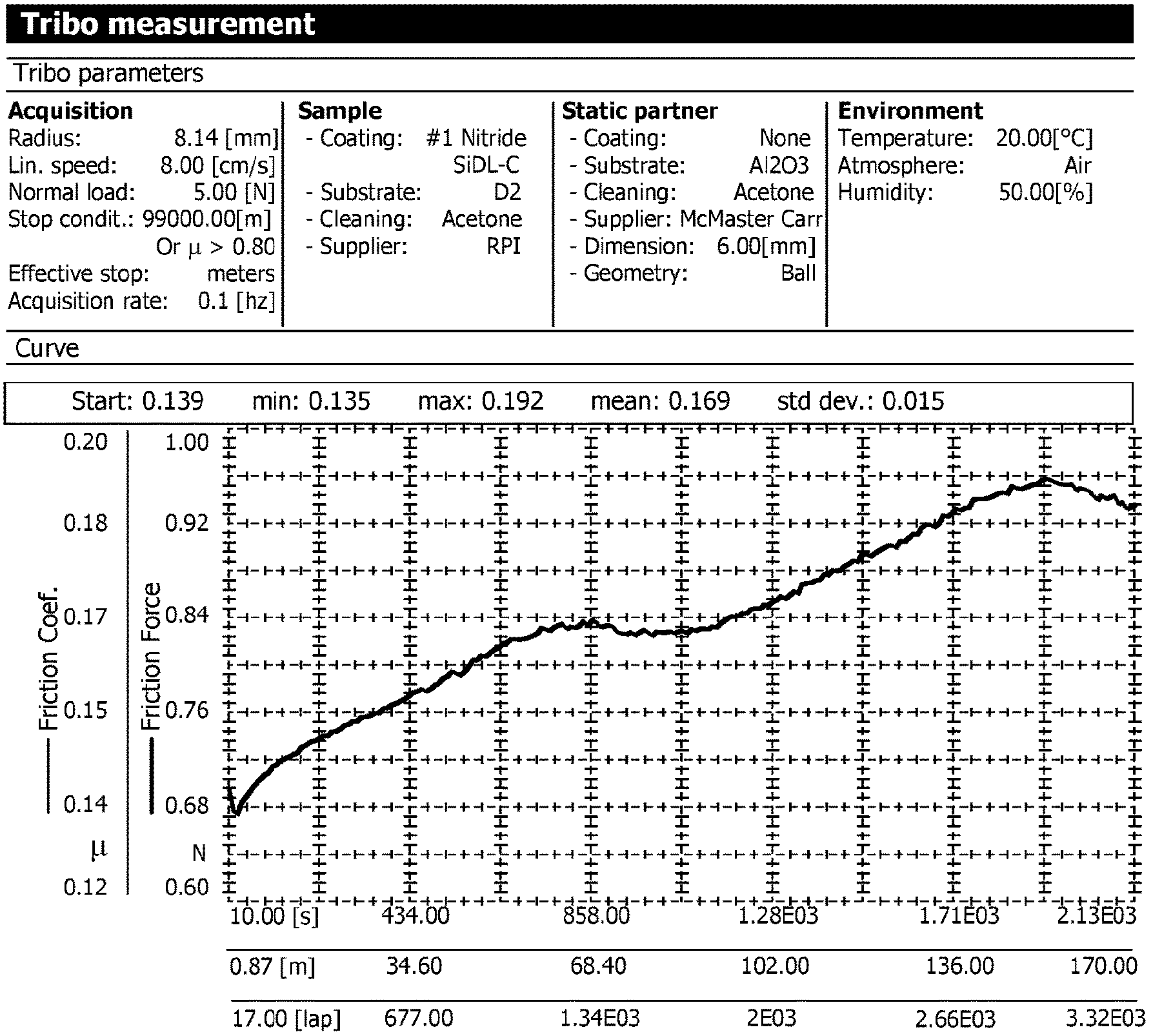
FIG. 7 is a graph depicting a pin-on-disk friction coefficient and wear measurement of a comparative coating formed with 95% boron nitride/2.5% carbon/2.5% aluminum oxide.

A coating according to Comparative Example 5 was formed using a coating composition having 95 wt % of hexagonal boron nitride (h-BN) powder, 2.5 wt % of graphite powder and 2.5 wt % of $Al_2O_3$ (corundum). The coating composition was applied to a standardized 304SS test coupon. The coating composition was activated, and the substrate was coated according to the process described with respect to Comparative Example 1. The coefficient of friction and the wear resistance was measured on the pin-on-disk tribological measurement device described above. FIG. 7 shows the graph of the results from the testing of Comparative Example 5.

A coating according to Comparative Example 6 was formed using a coating composition having 75 wt % of hexagonal boron nitride (h-BN) powder, 5 wt % of graphite powder and 20 wt % of $Al_2O_3$ (corundum). The coating composition was applied to a standardized 304SS test coupon. The coating composition was activated, and the substrate was coated according to the process described with respect to Comparative Example 1. The coefficient of friction and the wear resistance was measured on the pin-on-disk tribological measurement device described above. FIG. 8 shows the graph of the results from the testing of Comparative Example 6.

Figure 9:
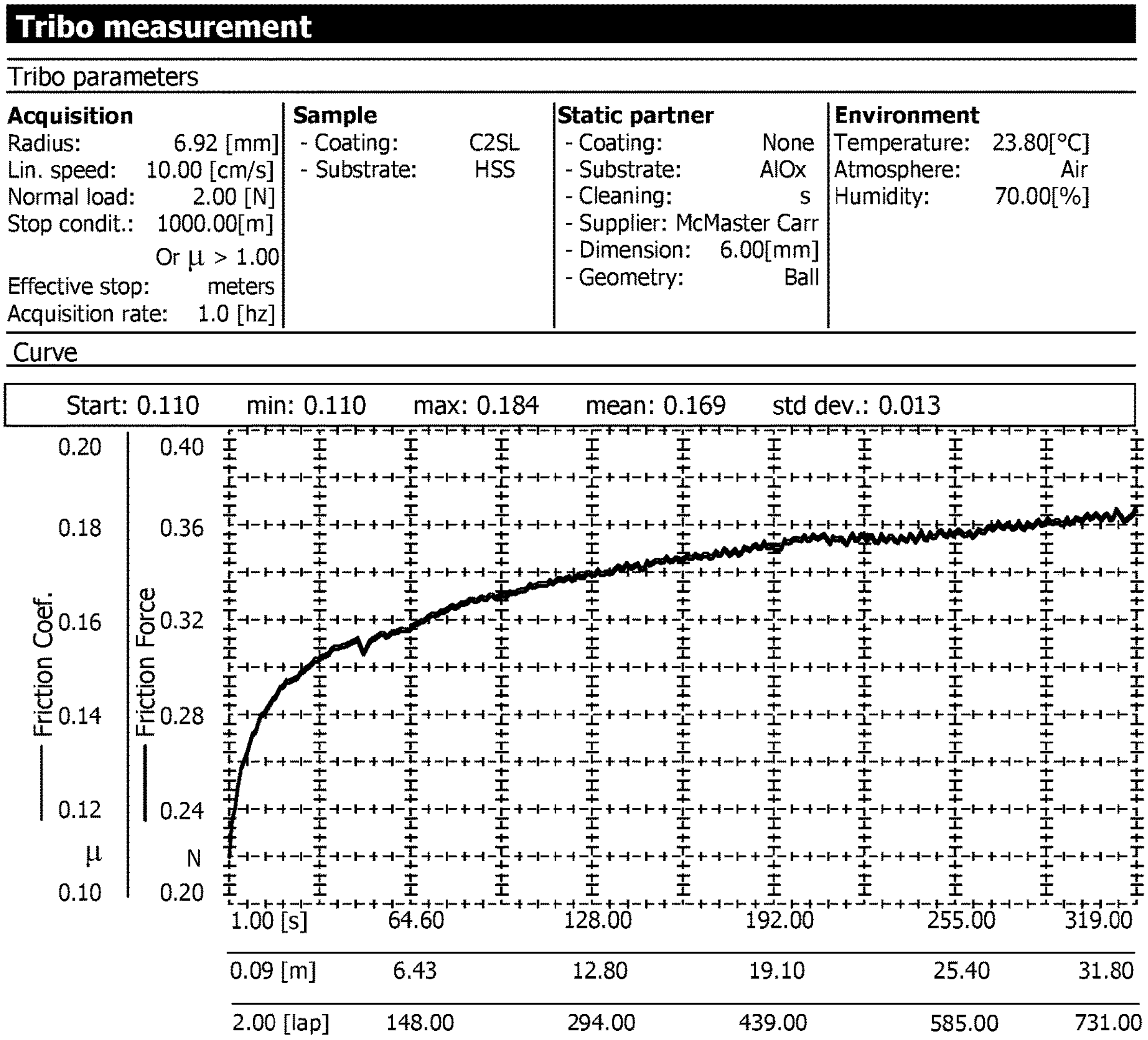
FIG. 9 is a graph depicting a pin-on-disk friction coefficient and wear measurement of a comparative coating formed with 75% boron nitride/25% carbon/0% aluminum oxide.

A coating according to Comparative Example 7 was formed using a coating composition having 75 wt % of hexagonal boron nitride (h-BN) powder, 25 wt % of graphite powder and 0 wt % of $Al_2O_3$ (corundum). The coating composition was applied to a standardized 304SS test coupon. The coating composition was activated, and the substrate was coated according to the process described with respect to Comparative Example 1. The coefficient of friction and the wear resistance was measured on the pin-on-disk tribological measurement device described above. FIG. 9 shows the graph of the results from the testing of Comparative Example 7.

A coating according to Comparative Example 8 was formed using a coating composition having 0 wt % of hexagonal boron nitride (h-BN) powder, 75 wt % of graphite powder and 25 wt % of $Al_2O_3$ (corundum). The coating composition was applied to a standardized 304SS test coupon. The coating composition was activated, and the substrate was coated according to the process described with respect to Comparative Example 1. The coefficient of friction and the wear resistance was measured on the pin-on-disk tribological measurement device described above. FIG. 10 shows the graph of the results from the testing of Comparative Example 8.

For each of the Examples above, all of the active powder components were obtained from Alfa Aesar, Haverhill, MA and had a purity of at least 99.99% and a particle size less than 5 microns.

TABLE 3 shows a summary of the coefficient of friction and wear resistance results of Comparative Examples 4-8 and Example 4.

TABLE 3

| Test Sample | Active Coating Components | Coefficient of Friction | Wear Resistance (distance in meters) |
|---|---|---|---|
| Comparative Example 4 | 50% Boron/ 20% Graphite/ 30% $Al_2O_3$ | 0.349 | 17.8 meters |
| Example 4 | 75% Boron/ 20% Graphite/ 5% $Al_2O_3$ | 0.064 | greater than 787 meters (no failure) |
| Comparative Example 5 | 95% Boron/ 2.5% Graphite/ 2.5% $Al_2O_3$ | 0.169 | 68.4 meters |
| Comparative Example 6 | 75% Boron/ 5% Graphite/ 20% $Al_2O_3$ | 0.250 | 11.20 meters |
| Comparative Example 7 | 75% Boron/ 25% Graphite/ 0% $Al_2O_3$ | 0.169 | 6.43 meters |

TABLE 3-continued

| Test Sample | Active Coating Components | Coefficient of Friction | Wear Resistance (distance in meters) |
|---|---|---|---|
| Comparative Example 8 | 0% Boron/ 75% Graphite/ 25% $Al_2O_3$ | 0.488 | 7.2 meters |

For the collected test data, as shown in TABLE 3, it can be concluded that the composition represented by Example 4 with 75 wt % boron nitride/20 wt % Graphite/5 wt % $Al_2O_3$ provides the most desirable combination of properties. For all other combinations it can be seen that either the friction was very high or due to increased roughness from $Al_2O_3$ the total wear resistance distance was highly compromised.

INDUSTRIAL APPLICATION

Various elements were mixed to make a coating composition, according to the present invention, and applied to substrates representing various industrial applications. The coatings formed were measure for wear, coefficient of friction impact effect as well as carbon shedding and heat dissipation.

Molybdenum (molybdenum disulfide ($MoS_2$)), boron nitride (hexagonal boron nitride (h-BN) powder), silicon (silicon powder) and 20 wt % graphite powder/5 wt % $Al_2O_3$ (corundum) are provided for each of the following examples. The coating composition preparation utilizes liquid toluene as the carrier. The preparation and activation are the same for all three compositions. The test samples are finished machine parts in all cases. The different coating compositions utilized in the following examples include 77 wt % (molybdenum, silicon or boron nitride), 19 wt % Graphite and 4 wt % $Al_2O_3$. The test samples are finished machine parts in all cases.

For each of the Examples above and below, all of the active powder components were obtained from Alfa Aesar, Haverhill, MA and had a purity of at least 99.99% and a particle size less than 5 microns.

Automotive

In the Automotive example, a stamping die for an oil pan (deep draw) made from D2 steel is provided. An initial stamping die is run in production without any coating and the number of hits is recorded for acceptable parts fabricated. As the die set starts to fail the required readings are recorded. The same process is repeated with different combination of coating components. The results are shown in TABLE 4.

TABLE 4

| Test Sample | Substrate with Treatment | Number of Cycles | Coefficient of Friction |
|---|---|---|---|
| Comp. Example 9 | Raw steel D2 | 8000 | 0.38 |
| Comp. Example 10 | Steel D2 with Molybdenum | 28000 | 0.10 |
| Comp. Example 11 | Steel D2 with Silicon | 16000 | 0.06 |
| Example 5 | Steel D2 with Boron Nitride | 14000 | 0.08 |

For the collected test data, as shown in TABLE 4, it can be concluded that the composition represented by Example 5 with 75 wt % boron nitride/20 wt % Graphite/5 wt % $Al_2O_3$ provides acceptable cycle properties for use in an automotive application.

Firearms

An example is provided to demonstrate the coating utilization in firearms. The firearm examples are carried out in two steps. The first experiment takes a 4-inch barrel made of 4140 carbon steel. A benchmark of the performance is provided for the untreated barrel and then the same parameters are monitored using different coating compositions.

The second step utilizes a titanium suppressor and benchmarks the performance before application of bare 4140 carbon steel. Then the same parameters are measured utilizing different coating compositions.

Step 1—Barrel Test

Test barrel is prepared for testing. The barrel used is an MXP-45 M2.D compact barrel, full metal jacket-45 Caliber ammunition is shot through the barrel and the inspection is done every 100 cycles and data recorded for untreated barrel and then barrels treated with different compositions. In addition, the interval between cleaning cycles was determined, wherein the number of shots with the ammunition were recorded between required cleanings for various barrel lengths. The results are as shown in TABLES 5, 6 and 7.

The shorter the time taken by the substrate the better is the heat dissipation properties of the coating composition.

Carbon Shedding—Carbon shedding is determined via a methodology which can compare the amount of Dirt/Waste/Carbon which is removed from the used barrel after determined frequency of use. Dirt/Waste/Carbon measurement is provided by cleaning the barrel at determined frequency of firing. All dirt/carbon soot waste collected is weighted to determine shedding.

From the data above in TABLES 5-7 the metal surface with the boron nitride containing coating composition provides the best combination of properties. The cool down rates are lower as well as the waste/carbon clean up each 100 shots is greatly improved.

Step 2—Silencer Test

For the purpose of this example, an 8-inch silencer made from titanium according to U.S. Army standards for semi-automatic and automatic weapon systems. The silencers used for the case study are treated with three different coating compositions applied by dynamic compound deposition and then the performance, including sound, recoil and velocity are measured. The results are shown in TABLE 8.

TABLE 5

| Test Sample | Substrate and Treatment | Coefficient of Friction | | Heat Dissipation Cool Downtime (Seconds) 100 | 200 | 300 | 400 | 500 |
|---|---|---|---|---|---|---|---|---|
| Comp. Example 12 | 4140 Carbon Steel only | 0.4 | 0.6 | 80 | 82 | 78 | 90 | 95 |
| Comp. Example 13 | 4140 Carbon Steel with Molybdenum | 0.10 | 0.14 | 80 | 78 | 81 | 85 | 80 |
| Comp. Example 14 | 4140 Carbon Steel with Silicon | 0.06 | 0.09 | 92 | 95 | 90 | 89 | 95 |
| Example 6 | 4140 Carbon Steel with Boron Nitride | 0.08 | 0.09 | 68 | 55 | 52 | 54 | 58 |

TABLE 6

| Test Sample | Substrate and Treatment | Carbon Shedding Cleaning/ Waste Collected (mg) 100 | 200 | 300 | 400 | 500 |
|---|---|---|---|---|---|---|
| Comp. Example 15 | 4140 Carbon Steel only | 8 | 9 | 8 | 9 | 8 |
| Comp. Example 16 | 4140 Carbon Steel with Molybdenum | 6 | 6 | 7 | 6 | 6 |
| Comp. Example 17 | 4140 Carbon Steel with Silicon | 8 | 9 | 8 | 8 | 8 |
| Example 7 | 4140 Carbon Steel Boron Nitride | 3 | 2 | 3 | 2 | 2 |

TABLE 7

| Metal and Treatment | Cleaning Required* 6 inch | 12 inch | 18 inch | 24 inch |
|---|---|---|---|---|
| Metal (varieties) | 200 shots | 200 shots | 350 shots | 500 shots |
| Metal and BN Mix | 800 shots | 800 shots | 1400 shots | 1800 shots |

*Cleaning required is defined as an interval or number of shots after which the barrel must be cleaned to achieve acceptable functioning.

Coefficient of Friction—The coefficient of friction is calculated using pin-on-disk methodology, as discussed above.

Heat Dissipation—Heat Dissipation is determined by using temperature gun where the temperature of the substrate is captured during operation and then at regular intervals in seconds to determine the time taken by the substrate to get to 97° F. Time taken is recorded in seconds.

TABLE 8

| Properties | Industry Standard Bare Titanium | Titanium with Molybdenum | Titanium with Silicon | Titanium with Boron Nitride |
|---|---|---|---|---|
| Sound (decibel) | 150-170 | 148 (average of 10) | 135 (average of 10) | 122 (average of 10) |
| Recoil | 10.5 | 9.2 | 8.7 | 8.2 |
| Flash Reduction | Visible | Visible | Not visible | Not visible |
| Velocity **independent of accuracy | 1500 fps | 1850 fps | 1800 fps | 2150 fps |

**The short-listed composition of BN is under life cycle testing to establish "Mean Time Between Failures" for various characteristics.

Sound—Sound created by the firearm used in hunting is characterized by high frequency short duration impulsive noise. The measurement is done using a microphone. The peak lend of signal will depend on the physical distance from the firearm and the azimuth relative to the end of the barrel.

Recoil—Recoil is measured based on the simple physical principle of conservation of momentum based upon the velocity of the rifle. The calculation is:

$$M_{rifle}V_{rifle} = M_{proj}V_{proj} + M_{gas}V_{gas}$$

$M_{rifle}$ = Rifle Mass $V_{rifle}$ = Velocity of the rifle upon firing $M_{proj}$ = Bullet mass -continued $V_{proj}$ = Bullet velocity $M_{gas}$ = Propellant charge mass $V_{gas}$ = Propellant charge velocity Once the velocity of the rifle is calculated, the recoil energy is calculated.

$$\sum \text{recoil} = \frac{1}{2} M_{rifle} V_{rifle}^2$$

Flash—Measured as a light intensity in the dark room setup. The intensity gun is set up to get the reading when the shot is fired from the gun.

Velocity of Bullet—The velocity of the bullet (V) is calculated as:

$$V^2 = V_0^2 + Qarc$$

where $V_0$ is initial velocity, n is the distance travelled inside the gun barrel and V is the muzzled velocity, as in acceleration.

According to military standard MIL-STD 1474E, the permissible sound levels for silencers fall between 150 dB-170 dB for untreated silencer, the recoil of 10.5 lb and a velocity of 1200-1600 fps is acceptable. The flash is generally characterized visual with either visible or non-visible. The velocity of minimum 1200 fps is acceptable. Accordingly, the testing performed and tabulated above in TABLE 8 indicates that the boron nitride containing composition provides the best combination of properties for barrels as well as silencers.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A method of forming a coating composition, comprising:

providing a combination of components consisting essentially of (a) boron nitride, (b) carbon, (c) aluminum oxide and (d) a liquid carrier, each of the boron nitride, carbon and aluminum oxide being in particulate form; and activating the coating composition combination of components to form an activated coating composition;

wherein the activated coating composition consists essentially of active components (a), (b) and (c) having from about 60.0 wt % to about 90.0 wt % boron nitride, from about 16 wt % to about 24 wt % carbon and from about 4 wt % to about 6 wt % aluminum oxide and forms a coating upon contact with a substrate;

wherein the liquid carrier includes toluene or ammonia.

2. The method according to claim 1, wherein the activating includes exposing the combination of components to a mechanical agitation.

3. The method according to claim 2, wherein the activating includes exposing the combination of components to a mechanical agitation including vibrating the coating composition.

4. The method according to claim 3, wherein the vibrating of the combination of components includes vibrating at a frequency from about 1 Hz to about 300 Hz.

5. The method according to claim 1, wherein the boron nitride has a particle size of from 0.1 to 50 micrometers.

6. The method according to claim 1, wherein the carbon includes graphite.

7. The method according to claim 6, wherein the graphite has a particle size of from 0.1 to 50 micrometers.

8. The method according to claim 1, wherein the aluminum oxide is devoid of forms other than corundum.

9. The method according to claim 8, wherein the aluminum oxide has a particle size of from 0.1 to 50 micrometers.

10. The method of claim 1, wherein the activated coating composition includes active components having from about 70.0 wt % to about 80.0 wt % boron nitride, from about 18 wt % to about 22 wt % carbon and from about 4.5 wt % to about 5.5 wt % aluminum oxide.

11. The method of claim 1, wherein the activated coating composition consisting essentially of (a) boron nitride, (b) carbon and (c) aluminum oxide in weight ratios (a):(b):(c) is from about 14 to about 18:from about 1 to about 8:from 0.3 to about 1.7.

12. A method of forming a coating composition, comprising:

providing a combination of components consisting essentially of (a) boron nitride, (b) carbon, (c) aluminum oxide and (d) a liquid carrier, each of the boron nitride, carbon and aluminum oxide being in particulate form; and activating the coating composition combination of components to form an activated coating composition;

wherein the activated coating composition consists essentially of active components (a), (b) and (c) having from about 60.0 wt % to about 90.0 wt % boron nitride, from about 16 wt % to about 24 wt % carbon and from about 4 wt % to about 6 wt % aluminum oxide and forms a coating upon contact with a substrate;

wherein the boron nitride includes hexagonal boron nitride.

13. The method according to claim 12, wherein the boron nitride has a particle size of from 0.1 to 50 micrometers.

14. The method according to claim 12, wherein the carbon includes graphite.

15. The method according to claim 14, wherein the graphite has a particle size of from 0.1 to 50 micrometers.

16. The method according to claim 12, wherein the aluminum oxide is devoid of forms other than corundum.

17. The method according to claim 16, wherein the aluminum oxide has a particle size of from 0.1 to 50 micrometers.

18. The method according to claim 12, wherein the liquid carrier includes toluene or ammonia.

19. The method of claim 12, wherein the activated coating composition includes active components having from about 70.0 wt % to about 80.0 wt % hexagonal boron nitride, from about 18 wt % to about 22 wt % carbon and from about 4.5 wt % to about 5.5 wt % aluminum oxide.

20. The method of claim 12, wherein the activated coating composition consisting essentially of (a) hexagonal boron nitride, (b) carbon and (c) aluminum oxide in weight ratios (a):(b):(c) is from about 14 to about 18:from about 1 to about 8:from 0.3 to about 1.7.

* * * * *